United States Patent [19]

Rioux, Jr.

[11] Patent Number: 4,998,277
[45] Date of Patent: Mar. 5, 1991

[54] TELEPHONE HANGER FOR HOSPITAL BED

[76] Inventor: Robert A. Rioux, Jr., 6175 Crestview Rd., North Syracuse, N.Y. 13212

[21] Appl. No.: 519,650

[22] Filed: May 7, 1990

Related U.S. Application Data

[62] Division of Ser. No. 301,609, Jan. 26, 1989, Pat. No. 4,945,561.

[51] Int. Cl.⁵ .............................................. H01M 1/04
[52] U.S. Cl. ......................................... 379/454; 5/503; 248/214; 248/477
[58] Field of Search .................... 379/454, 455; 5/503, 5/507, 508; 248/214, 215, 229, 231.8, 311.2, 313, 340, 316, 477

[56] References Cited

U.S. PATENT DOCUMENTS

| | | | |
|---|---|---|---|
| 3,653,624 | 4/1972 | Abel | 248/312 |
| 3,802,657 | 4/1974 | Jackson | 248/214 |
| 4,203,175 | 5/1980 | Heine | 5/503 |
| 4,351,505 | 9/1982 | Wickersham | 248/316.8 |
| 4,406,928 | 9/1983 | MacKenzie | 379/454 |
| 4,432,522 | 2/1984 | Pruente et al. | 248/215 |
| 4,504,992 | 3/1985 | Herron et al. | 5/507 |
| 4,527,018 | 7/1985 | Offredi | 379/454 X |

Primary Examiner—Carl D. Friedman
Assistant Examiner—Daniel Hulseberg
Attorney, Agent, or Firm—Wall and Roehrig

[57] ABSTRACT

A telephone support or holder clamps to a hospital bed rail assembly to accommodate a telephone instrument of the one-piece type. The holder has a bracket formed of a vertical back wall with upper and lower hooks that secure the holder to the upper and lower rails of the bed rail assembly. The telephone instrument is held between a pair of retaining members that each comprise a side wall and a front flange that extends towards the opposite retaining member. A support shelf or telephone rest can be affixed on the bracket or can be selectively positionable along a vertical slot. The bracket can have a C-shaped clamp member to secure to the vertical post of the older style hospital bed rails.

10 Claims, 4 Drawing Sheets

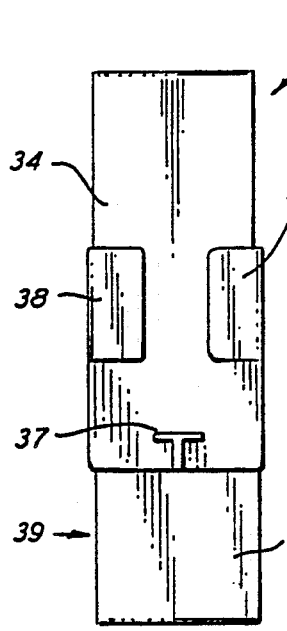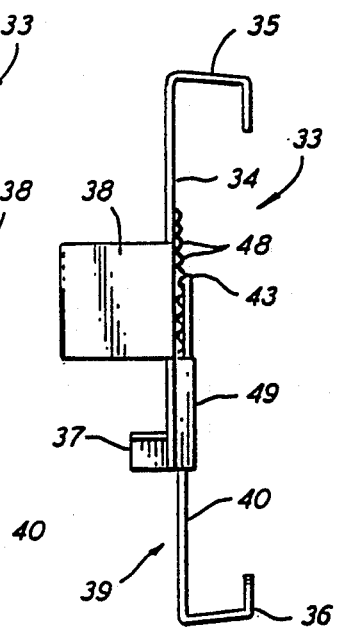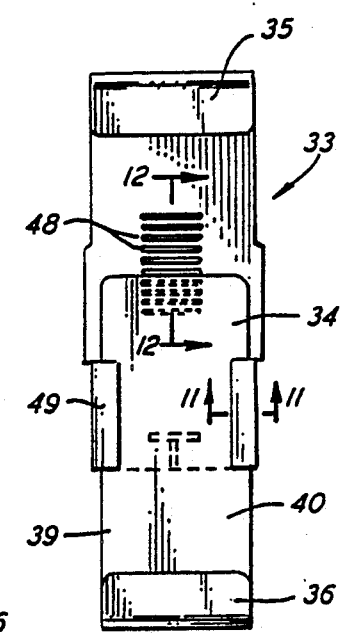
FIG. 5     FIG. 6     FIG. 7
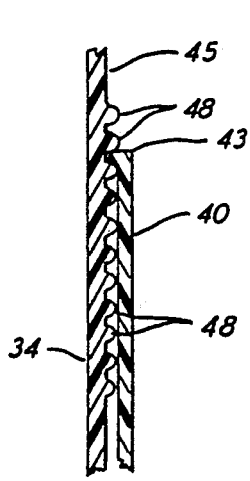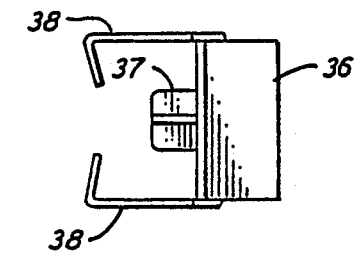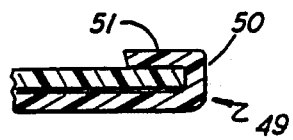
FIG. 12     FIG. 8     FIG. 11
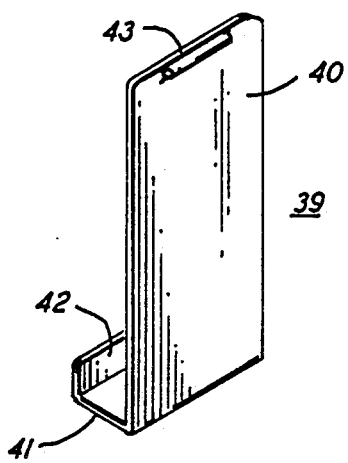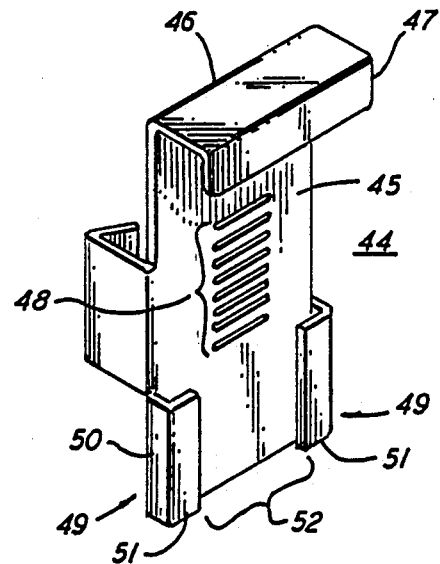
FIG. 9     FIG. 10

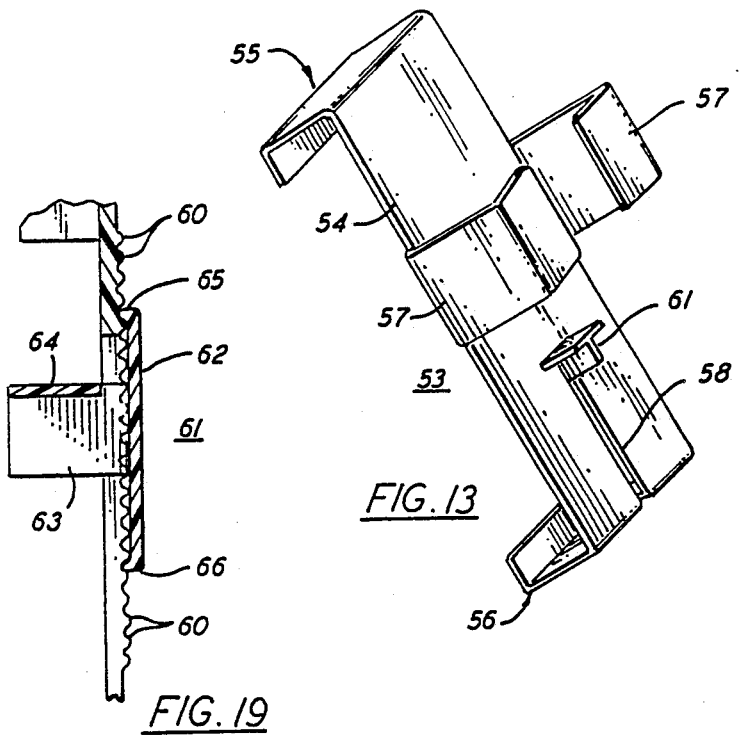
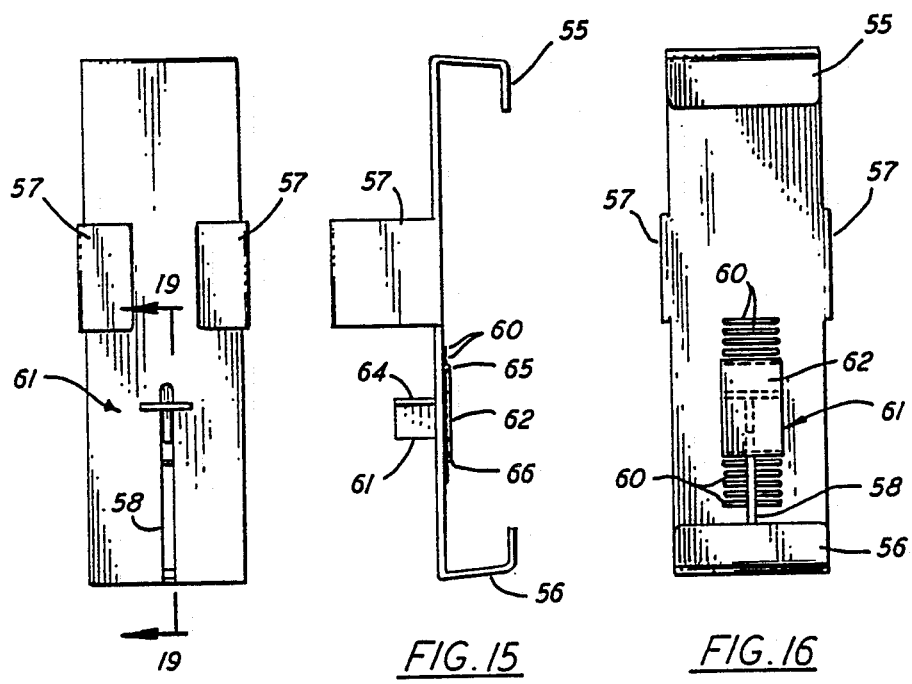
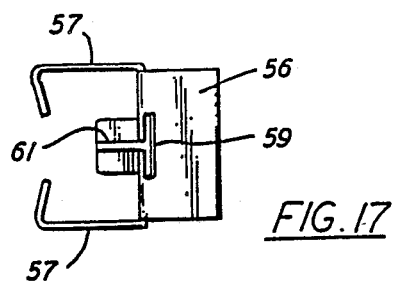

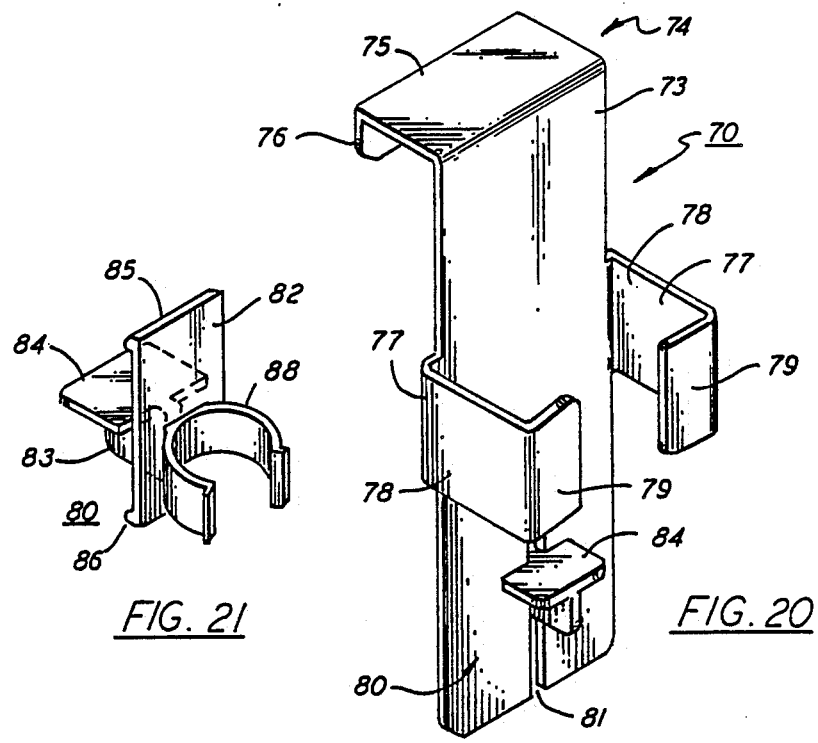
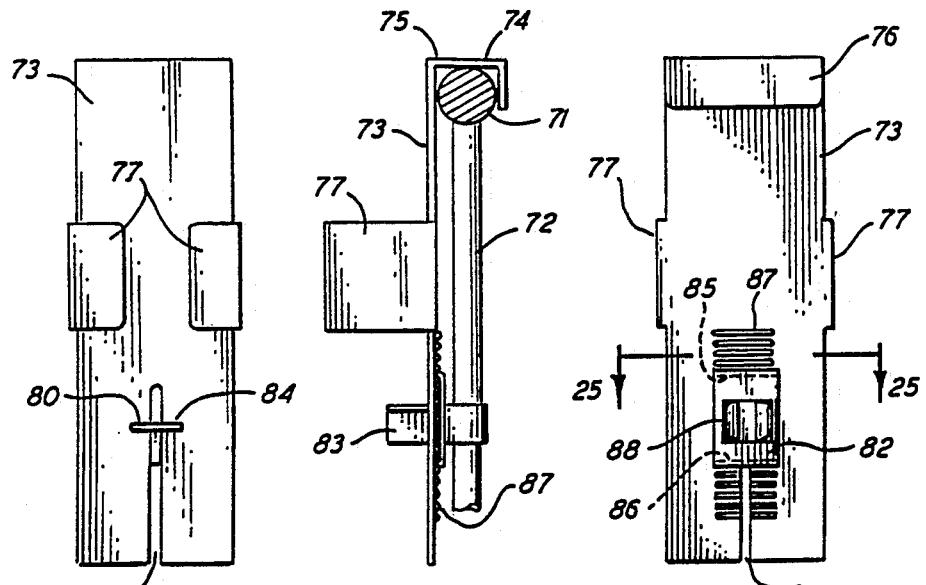
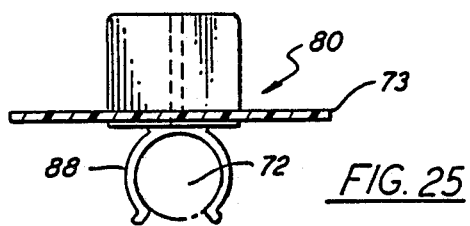

TELEPHONE HANGER FOR HOSPITAL BED

This is a divisional of my copending U.S. Pat. Application Ser. No. 301,609, filed Jan. 26, 1989, now U.S. Pat. No. 4,945,561.

BACKGROUND OF THE INVENTION

This invention relates to telephone supporting devices for use in a hospital, nursing home, convalescent home, or sickroom. The invention is more particularly concerned with devices for holding a one-piece telephone instrument and which are mountable on a bed rail or similar structure.

Hospital patients who are confined to bed are often provided with telephone service at the bedside. Telephone instruments can be standard or miniature desk sets placed on a bedside table, or can be unitary or one-piece instruments, sometimes called handset phones, placed in a telephone holder near the bed.

Patients' access to bedside telephones is often hindered by the presence of bed rails, which are necessary to keep the patient from inadvertently rolling out of bed. One previous proposal to address this problem appears in U.S. Pat. No. 4,431,154. That patient relates to a telephone holder for mounting on the bed rail for holding a telephone of the Trimline type. The holder hangs from the upper rail only, and holds the telephone instrument horizontally, with the base portion of the instrument reposed in a receptacle formed on the holder, and the handset portion resting on the base. Special slots are required to accommodate the line cord and the handset cord.

These bed rail telephone holders have been somewhat difficult to use. The telephone is difficult for a motion-impaired patient to reach and pick up, because using the instrument generally involves reaching over the bed rail and then reaching down below the rail to pick up the handset or to put it back.

OBJECTS AND SUMMARY OF THE INVENTION

It is an object of this invention to provide an improved telephone holder which clamps to upper and lower rails of a bed rail assembly.

It is a further object of this invention to provide a telephone holder which is simple to install and use, and convenient for the patient.

According to one aspect of this invention, a telephone support device holds a one-piece telephone instrument from the hospital bed-rail assembly. The instrument of this type has an elongated housing. An earpiece, a mouthpiece, a dialer of either the rotary or push-button type, and a hookswitch button are disposed on one side.

A bracket mounts onto the bed rail assembly. The bracket is formed of a rear wall, which is favorably an elongated plate. Upper and lower hook means are provided at upper and lower edges of the rear wall. The hook means extend back and over the upper rail and under the lower rail of the bed rail assembly. A support shelf protrudes from a front surface of the rear wall and serves as a telephone rest. A pair of retaining members are disposed above the support shelf on opposite side edges of the rear wall. The retaining members are each formed of a side wall and a front flange that protrudes laterally towards the other retaining member. Together with the rear wall, these retaining members define a channel for the one-piece telephone instrument. The instrument is slidably removeable from the channel, and is slidably insertable into the channel as well, to rest on the support shelf. At that time, the hook switch button is depressed against the rear wall, so that the instrument is in an on-hook or standby mode.

The rear wall can be one piece, or can be two intermeshing pieces with a provision for adjusting the length to match the height of the bed rail. In an alternative version, the position of the support shelf is adjustable to adjust the position of the one-piece telephone instrument on the holder.

The above and many other objects, features and advantages of this invention will be more fully understood from the ensuing description of a few preferred embodiments, which should be read in connection with the accompanying Drawing.

BRIEF DESCRIPTION OF THE DRAWING

FIGS. 5, 6, and 7 are front, side, and rear elevational views, respectively, of a telephone holder according to a second embodiment of this invention.

FIG. 8 is a bottom plan view of the telephone holder of the second embodiment.

FIGS. 9 and 10 are perspective views of a lower plate portion and an upper plate portion, respectively, of the second embodiment.

FIG. 11 is a detail view taken at line 11—11 of FIG. 7 showing retaining rib and tooth structure.

FIG. 12 is a detail cross-section taken at line 12—12 of FIG. 7 showing slidable open sleeve structure.

FIG. 13 is a perspective view of a telephone holder according to a third embodiment of this invention.

FIG. 14, 15, 16, and 17 are front elevation, side elevation, rear elevation, and bottom plan view, respectively of the third embodiment.

FIG. 18 is a detail perspective view of the movable support bracket of the third embodiment.

FIG. 19 is a detail sectional view taken at line 19—19 of FIG. 14.

FIG. 20 is a perspective view of a telephone holder according to a fourth embodiment of this invention.

FIG. 21 is a detailed perspective view of a portion of the holder of FIG. 20.

FIGS. 22, 23 and 24 are front elevation, side elevation and rear elevation views, respectively, of the telephone holder of FIG. 20.

FIG. 25 is a sectional view along line 25—25 of FIG. 24.

DETAILED DESCRIPTION OF THE PREFERRED EMBODIMENTS

Figure 1:
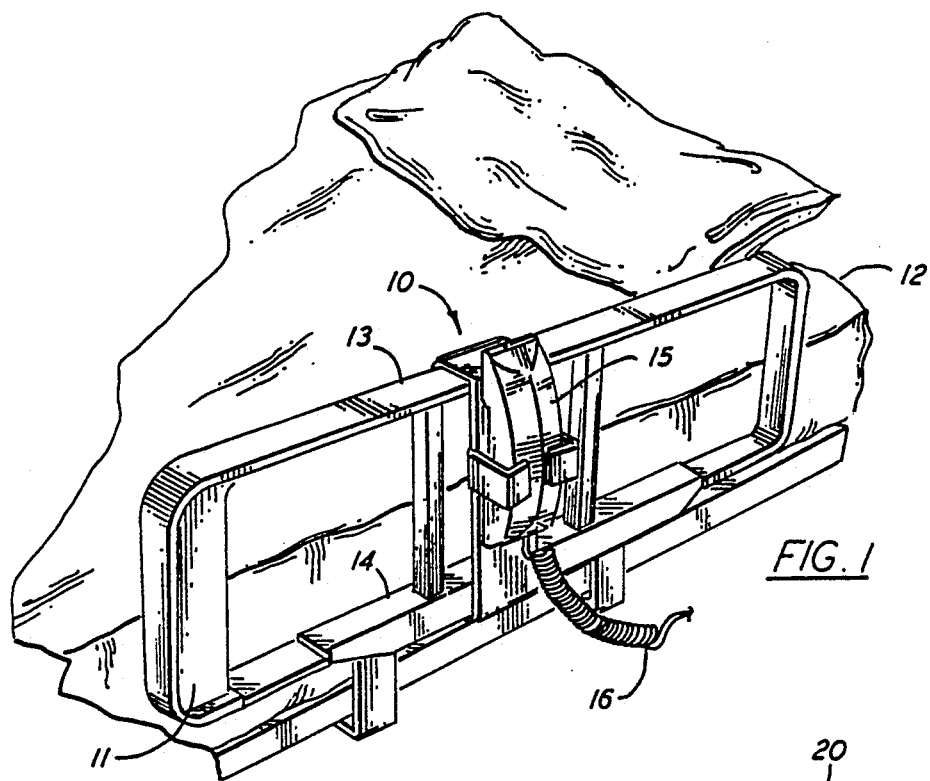
FIG. 1 is a perspective view showing a telephone holder mounted on a hospital bed side-rail assembly.

With reference to the Drawing, FIG. 1 shows a telephone holder 10 mounted on a bedside rail assembly 11 on a hospital bed 12. In this case the assembly 11 has an upper or top horizontal rail 13 spaced above a lower or bottom horizontal rail 14. A telephone instrument 15 is shown here in the holder 10 and positioned for easy access by a patient in the bed. This instrument is of the one-piece type with an elongated housing that contains the necessary electrical elements, such as a ringer and a hybrid, and with an earpiece, a mouthpiece, a dialing mechanism (either rotary or push button), and a hook switch or hookswitch button, all mounted on one surface, i.e., the side facing towards the bed rail assembly 11. The hook switch, when depressed, disconnects the instrument (i.e., puts it in an on-hook condition) and when released, connects the instrument to the line (i.e., takes it off-hook). A coiled line cord 16 connects the instrument 15 to a wall outlet (not shown).

Figure 2:
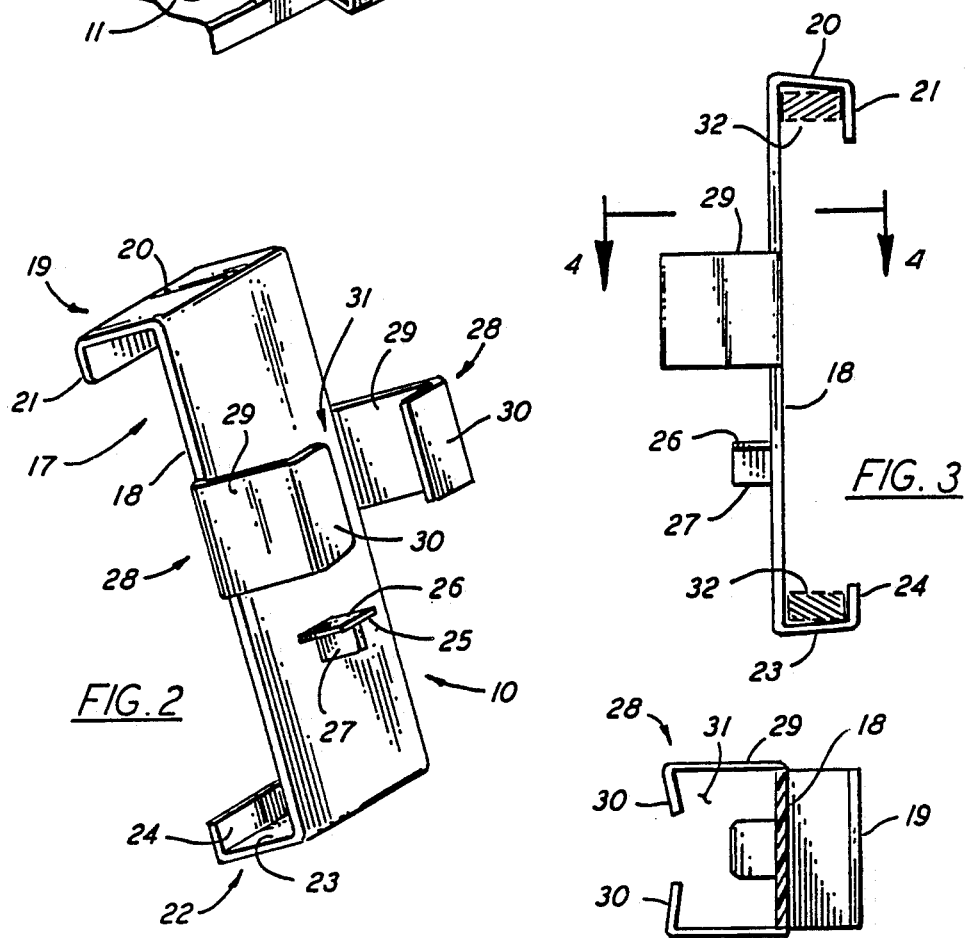
FIG. 2 is a perspective view of the telephone holder according to one embodiment of this invention.
Figure 3:
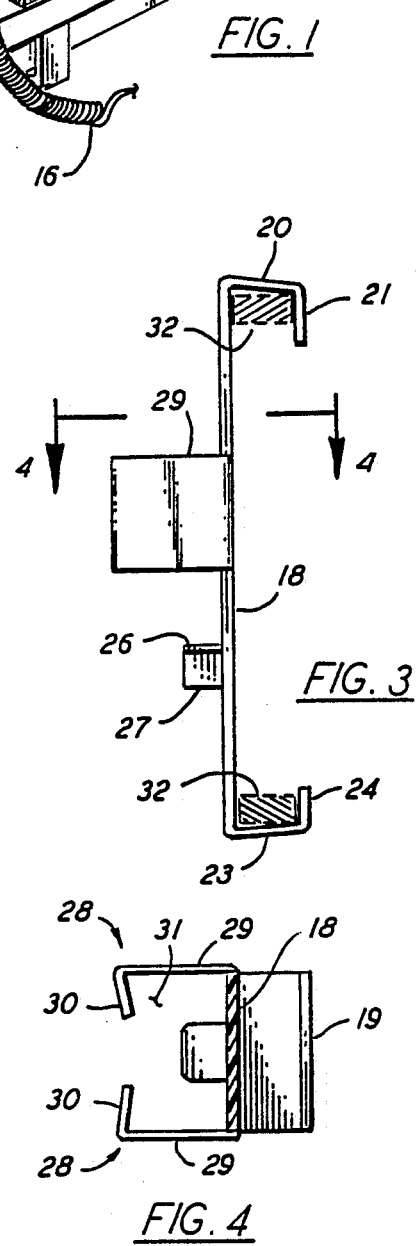
FIG. 3 is a side elevation of the telephone holder of FIG. 2.
Figure 4:
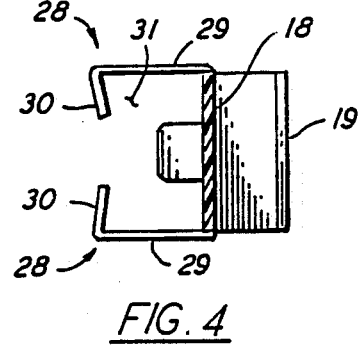
FIG. 4 is a top plan view taken at line 4—4 of FIG. 3.

The structure of the telephone holder 10 is shown in detail in FIGS. 2, 3, and 4. The holder is one-piece and formed of a resilient semi-rigid or rigid material, and is favourably injection molded of a plastic synthetic resin, such as polystyrene, Delrin, or another suitable material.

As shown e.g. in FIGS. 2 and 3, the holder 10 has a generally C-shaped bracket portion 17 that mounts onto the upper and lower rails 13, 14 of the rail assembly. The bracket 17 is formed basically of an elongated rear wall 18 which here is in the form of a vertical strip or plate. An upper hook portion 19 is formed at its upper edge to secure to the upper rail 13. This hook portion has a flange 20 that extends rearward form the top edge of the rear wall 18 and a down-turned lip 21 that reaches behind the rail 13. At the lower edge of the rear wall 18 is a lower hook portion 22 that secures to the lower rail 14. This hook portion includes a flange 23 that extends from the lower edge of the rear wall 18 rearwards beneath the lower rail 14, and has an upturned lip 24 that reaches behind the rail 14.

On the forward side of the rear wall 18, i.e., the side away from the rail assembly 11, a telephone rest or support shelf 25 projects outward and serves as a stop member on which the telephone instrument 15 rests. Here the support shelf includes a horizontal shelf plate 26 and a vertical reinforcing bracket 27 to support the shelf plate 26.

A pair of telephone retaining members 28 above the support shelf 25 reach forward from opposite side edges of the rear wall 18. As shown in FIG. 4, there are left and right retaining members 28, each with a forwardly projecting side wall 29 and a front flange 30. The front flanges 30 each extend towards the opposite retaining member 28, and these flanges also angle inward slightly towards the rear wall 18.

The rear wall 18 and the two support brackets 28,28 viewed from above (FIG. 4) together define a generally C-shaped channel 31, which serves as a receptacle for the one-piece telephone instrument. The material of the support is semi-rigid and at least slightly resilient, so that the flanges 30 deflect to accommodate the telephone instrument 15 and urge the instrument towards the rear wall 18. This reliably depresses the hook switch button when the telephone instrument is in the holder 10.

Optimally, resilient pads 32 can be included on inner surfaces of the hook portion flanges 20 and 23 to improve the grip of the hook portions 19,22 on the upper and lower rails 13,14.

A telephone holder 33 according to a second embodiment is shown here in FIGS. 5 to 8. Here telephone holder 33 has an adjustable length, with snap action. The holder has a two-piece back wall 34 with an upper hook portion 35 and lower hook portion 36 that fit over the upper and lower rails 13,14 respectively, as well as a support shelf 37 and a pair of opposed retaining members 38 as in the first embodiment.

As shown in FIG. 9 the holder is formed with a separate lower portion 39. This portion has a lower vertical plate 40 that forms a lower half of the back wall 34, a rearwardly extending flange 41 and upwardly projecting lip 42 that together form the hook portion 36, and a tooth or sprag 43 in the form of a rib at the top edge of the lower plate 40. This tooth 43 is disposed horizontally at the forward side and extends across a center portion of the plate 40.

As shown in FIG. 10, an upper portion 44 of the telephone holder 33 is in the form of a vertical upper plate 45 that forms the upper half of the back wall 34 and at its upper edge a rearwardly extending flange 46 and depending lip 47 form the hook portion 35. On the back surface of the plate 45 there is a rack 48 of horizontal ribs which define grooves or spacings between them. These grooves receive and mate with the tooth 43 to establish a selected length for the combined upper and lower portions 44, 39, as shown, e.g., in FIG. 11.

Along the sides of the upper plate are a pair of open sleeves 49 that slidably receive side edges of the lower plate 40. In this embodiment the open sleeves each include a longitudinal side flange 50 and a back flange 51, the two back flanges extending partway toward one another over the back surface of the lower plate 40, as shown in FIG. 12. The two back flanges 51 define between them an open space 52 which is at least slightly greater than the extend of the ribs of the rack 48. Thus this space 52 is wide enough to accommodate flexure of the central part of the plate 40 that contains the tooth or sprag 43.

The holder 43 of this embodiment can be easily installed on a bed rail 11 by sliding the two portions 39,44 relative to one another until a snug fit is obtained. This embodiment will easily accommodate variations in the separation of the upper and lower rails 13, 14. The holder remains securely in place, but can be easily removed from the bed rail when desired.

A third embodiment is illustrated in FIGS. 13 to 19. Here, as shown initially in FIGS. 14 to 16, a telephone holder 53 is formed of a back wall 54, an upper hook portion 55, a lower hook portion 56, and retaining members 57 which can be generally identical with corresponding parts of the first embodiment. However, in this embodiment the back wall 54 has a central vertical slot 58 therethrough that extends to a bottom edge thereof, where it joins a transverse slot 59 in the lower hook portion 56. These two slots 58, 59 form a tee, as shown in FIG. 17. As shown in FIGS. 15 and 16, a plurality of parallel transverse ribs 60 are arranged over the length of the slot 58 on the rear, or rail side of the back wall 54.

In this embodiment, a movable support shelf unit 61 can be positioned at a selected location along the slot 58, so that the telephone instrument 15 will rest at an optimal position for access when reposed in the holder 53. Here, as shown in FIG. 18, the unit 61 is unitarily formed of a back plate 62, a vertical tongue 63 that projects forwardly through the slot 58, and a horizontal shelf 64 supported on a top edge of the tongue. At top and bottom edges of the plate 62 are an upper rib or tooth 65 and a lower rib or tooth 66. As shown in FIG. 19, these teeth 64, 65 engage grooves between the ribs 60 on the back wall 54 to hold the support shelf unit 61 at a desired position, but permit the same to be moved to a higher or lower position if desired.

The support shelf unit 61 can be installed by inserting its back plate 62 into the slot 59, and then moving the unit upwards, with the tongue 63 through the slot 58, until the teeth 64, 65 engage the ribs 60. This also makes replacement simple if the support shelf unit 61 should become broken or inoperative.

An alternative embodiment, now shown, could combine the adjustable bracket height feature of the second embodiment holder 33 with the adjustable shelf position feature of the third embodiment holder 53.

A fourth embodiment of this invention is shown in FIGs. 20 to 25, in the form of a hanging telephone holder 70 that is suited for use on older hospital beds of the type having a horizontal upper rail 71 supported on vertical posts 72 (See FIG. 23). Many features are identical with those of the previous embodiments. The holder is formed of a vertical back wall or plate 73 that has a hook portion 74 formed at its upper edge to extend rearwardly over the top rail 71. This hook portion includes an upper flange 75 and a depending lip 76. As in the previous embodiments there are a pair of retaining members 77, 77, each comprising a forwardly extending side wall 78 that protrudes forward from a side edge of the back wall 73, and a front flange 79 that extends towards the other retaining member 78.

This embodiment has a telephone rest or support shelf unit 80, as shown in FIGS. 21 and 25, which reposes in a vertical slot 81 that extends to the bottom edge of the back wall 73. Similar to the support shelf unit 61 of the third embodiment, this unit can be positioned as desired along the slot 81.

The support shelf unit 80 has a vertical back plate 82 and a vertical tongue 83 that extends from it through the slot 81 to support a horizontal shelf 84. Horizontal upper and lower ribs 85 and 86 respectively project forward from upper and lower edges of the plate 82 to engage horizontal ribs 87 formed on the rear surface of the back wall 73 along the slot 81.

To permit the holder to be secured to the vertical post 72, there is a spring clamp 88 formed on the rear surface of the telephone support shelf unit back plate 82. This spring clamp is generally C-shaped when viewed from above (FIG. 25) with its open side or gap to the rear. The clamp 88 snaps over the post 72 to hold the associated telephone holder 70 in place. The post 72 can be round or square.

In other related embodiments, the clamp could be affixed to the back wall by glueing, or could be molded unitarily with the holder. For example, the clamp could be constituted by a C-shaped cutout in the lower hook portion 22 of the first embodiment.

Also, while the embodiments of this invention are employed with a one-piece cord-type phone, it should be understood that the structure could be adapted to use with a cordless phone, a two-piece phone, or equipment other than telephones, such as a paging device, a blood pressure monitor, or other item.

Furthermore, while this invention has been described in detail with reference to certain preferred embodiment, it should be understood that the invention is not limited to those precise embodiments, but that modifications and variations would present themselves to those of skill in the art without departure from the scope and spirit of this invention, as defined in the appended claims.

What is claimed is:

1. In combination, a one-piece telephone instrument and a hospital room telephone support for supporting said one-piece telephone instrument from a hospital bed rail assembly of the type that has upper and lower horizontal rails spaced a predetermined distance apart;

the telephone instrument comprising an elongated housing having on one surface thereof an earpiece, a mouthpiece, and a hook switch which, when depressed, places the instrument in an on-hook condition and when released places the instrument in an off-hook condition, and the telephone support comprising a bracket for mounting onto the bed rail assembly, which includes a rear wall in the form of an elongated strip, upper hook means at a top edge thereof extending over the upper rail from a rear side of the rear wall, and lower hook means at a bottom edge of the rear flange extending under the lower rail from the rear side of side rear wall.

a supporting shelf extending outward from a front surface of the rear wall; and a pair of retaining members disposed on opposite side edges of said rear wall and reaching forward therefrom, each having a front flange that extends towards the opposite retaining member, the rear wall and the retaining members being formed of a resilient, semi-rigid material with the front flanges being angled towards said rear wall, said rear wall and said retaining members defining a retaining channel for holding the telephone instrument, the instrument being slideably removable from and insertable into said channel to rest on said support shelf with said angled-inward front flanges yieldably urging said instrument against said rear wall so that said hook switch is held depressed against said rear wall when said instrument is retained in said channel and resting on said support shelf.

2. One piece telephone instrument and support combination as in claim 1 wherein said bracket, said shelf, and said retaining members are unitarily formed.

3. One piece telephone instrument and support combination as in claim 1 wherein said hook means each include an end flange extending back from the associated end of said rear wall, and a lip at the free end of the flange.

4. One piece telephone instrument and support combination as in claim 3 wherein said hook means includes a resilient pad on the associated end flange between the back wall and the lip.

5. One piece telephone instrument and support combination as in claim 1 in which said retaining members each include a side wall extending forward from the back wall, and the associated front flange is back-angled from a forward edge thereof.

6. One piece telephone instrument and support combination as in claim 1 wherein said rear wall has a longitudinal slot therein and said support shelf includes a transverse member on a forward side of said rear wall, a plate disposed against a rear surface of said rear wall, and means passing through said slot connecting said transverse member to said plate, said support shelf being displaceable along said slot; said rear wall includes a plurality of parallel transverse grooves on said rear surface; and said support shelf plate includes at least one transverse engaging tooth for engaging a selected one of said grooves.

7. In combination, a one-piece telephone instrument and a room telephone support for supporting the one-piece telephone instrument from a hospital bed rail assembly of the type that has an upper horizontal rail and at least one vertical post supporting said rail;

the telephone instrument comprising an elongated housing having on a front surface thereof an earpiece, a mouthpiece, and a hook switch which when depressed places the instrument in an on-hook condition and when released places the instrument in an off-hook condition, and the telephone support comprising a bracket for mounting onto the bed rail assembly, which includes a rear wall in the form of an elongated strip, upper hook means at a top edge thereof extending over the upper rail from a rear side of the rear wall, and lower clamp means secured to the rear side of the rear wall below said upper hook means to secure to said vertical post;

a support shelf extending outward from a front surface of the rear wall; and a pair of retaining members disposed on opposite side edges of said rear wall and extending forward therefrom, each having a front flange that extends towards the opposite retaining member, the rear wall and the retaining members being formed of a resilient, semi-rigid material with the front flanges being angled inward towards said rear wall, said rear wall and said retaining members defining a retaining channel for the telephone instrument, the latter being slidably removable from and insertable into said channel to rest on said support shelf with said angled-inward front flanges yieldably urging said instrument against said rear wall so that said hook switch is held depressed against said rear wall when said instrument is retained in said channel and resting upon said support shelf.

8. One piece telephone instrument and support combination as in claim 7 wherein said lower clamp means includes a C-shaped resilient member.

9. One piece telephone instrument and support combination as in claim 8 wherein said support shelf is formed as a separate member from said rear wall and includes means for selectively slidably positioning the support shelf on said rear wall, and said C-shaped member is formed on a back portion of said separate member.

10. One piece telephone instrument and support combination as in claim 8 wherein said C-shaped member has a gap at its rearward side.

* * * * *